Oct. 25, 1938.

A. A. SCHABINGER

DEVICE FOR BASKETBALL GAMES

Original Filed Oct. 28, 1935

Re. 20,898

Inventor

By A.A.Schabinger

Arthur H. Sturges

Attorney

Reissued Oct. 25, 1938

Re. 20,898

UNITED STATES PATENT OFFICE 20,898

DEVICE FOR BASKETBALL GAMES

Arthur A. Schabinger, Chicago, Ill.

Original No. 2,049,593, dated August 4, 1936, Serial No. 47,072, October 28, 1935. Application for reissue July 25, 1938, Serial No. 221,213

7 Claims. (Cl. 273—1.5)

The present invention relates to game apparatus and more particularly for an improved basket or goal holder for use in playing the game of basket ball.

An object of the present invention is to provide a support for the ring of the basket for detachably holding the same at the top of a door, chair, chest of drawers or the like when it is desired to play the game indoors, such as with a soft rubber ball so that children may play the game indoors and in a room having doors at or near opposite ends.

Another object of the present invention is to provide a clip or holder which is adapted for detachable engagement over the upper end of the door so that when the game is played a pair of the baskets or goals may be supported on opposed doors, and the doors may be swung into substantially parallel relation and held in any suitable manner so that the game may be played.

The invention also aims at the provision of a cheap easily constructed yet strong device for detachable engagement with the ring at the top of the basket so that the ring may be detached from the hook or clip when not in use and the devices may be packaged or boxed in relatively small compact form for display, storage and sale purposes admitting easy handling of the devices.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
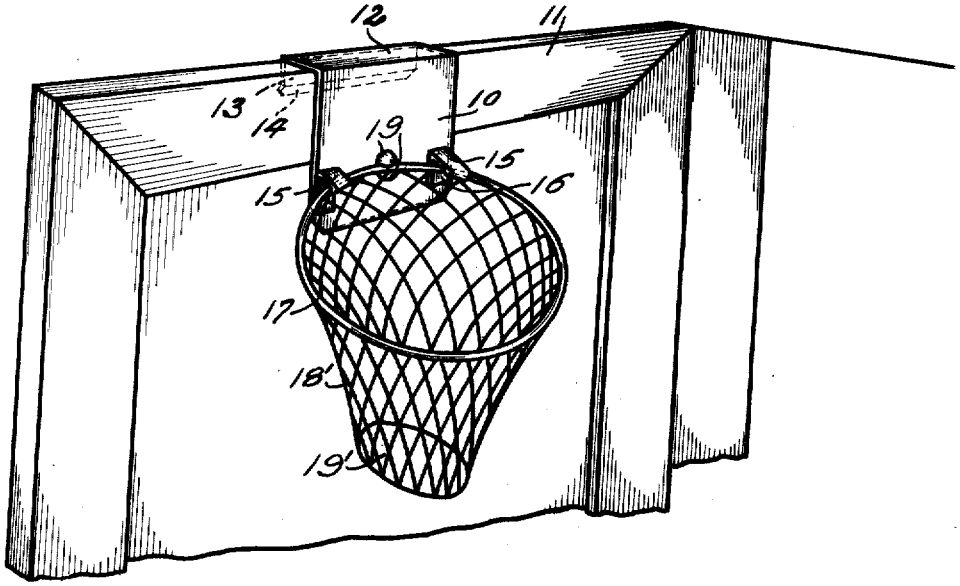
Figure 1 is a perspective view of a basket holder constructed according to the present invention as applied to the top of a door with the basket in position for use.
Figure 2:
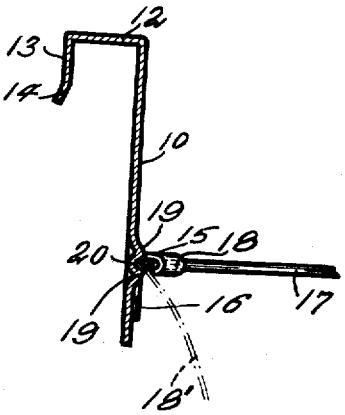
Figure 2 is an enlarged fragmentary view showing in section the clip and a portion of the ring at the top of the basket, the view being taken on the line 2—2 of Figure 3.

Referring now to the drawing, wherein like parts are indicated by similar numerals of reference throughout the several views, and wherein is illustrated one form of the invention, 10 designates a metal plate which is of suitable length to extend downwardly from the top of a door 11 or the like upon which the plate 10 is adapted to be suspended. The upper portion of the plate 10 is bent backwardly at substantially right angles to provide a bridge portion 12 adapted to lie across the upper edge of the door 11 and which at its rear end terminates in a downwardly extending flange 13 provided with an outturned lip 14 on its lower edge to facilitate the seating of the hook over the upper edge of the door 11. If desired the inner face of the plate 10 with its upper end hook formation may be lined with felt or other suitable material to prevent through contact the sheet metal with the door 11. The flange 13 and its lip 14 may also be given various configurations to adapt the hook to doors of different sizes.

Figure 3:
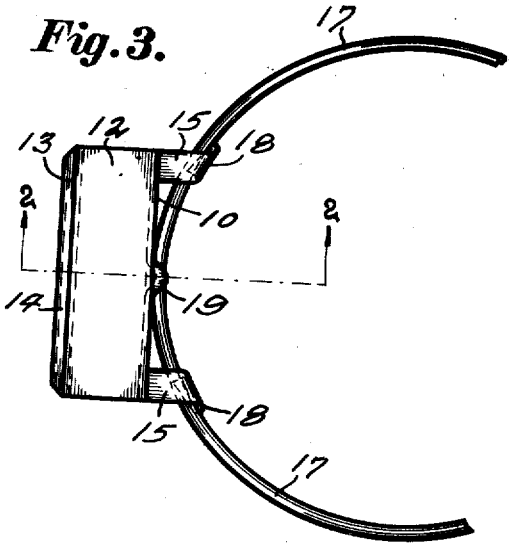
Figure 3 is a top plan view of the clip as applied to the basket ring.

Near the lower end of the plate 10 there is mounted a pair of outwardly extending arms 15 which may be of strap material or the like bent at right angles with horizontal portions 16 lying in face contact with the plate 10 and secured thereto by solder, welding or in any other suitable and economical manner. The arms 15 extend outwardly a sufficient extent to engage over spaced portions of a hoop 17 which forms the upper rim of a basket 18′ used in the playing of basket ball and which has the usual opening 19′ at its lower end. The arms 15 are disposed in spaced apart relation transversely of the plate 10, and preferably near the opposite lateral edges thereof as clearly shown in Figures 1 and 3. The outer ends of the arms 15 are rolled backwardly at an angle to the arms and outwardly from each other as shown in Figure 3 so as to provide hooks 18 which conform to the curvature of the hoop 17 and which firmly engage about the latter at spaced points, the arms 15 being proportioned to bind the portion of the hoop 17 between the arms 15 against the front face of the plate 10. The plate 10 is provided in horizontal and transverse alignment with the arms 15 with a pair of outwardly crimped projections 19 which are spaced apart vertically to provide a groove or seat 20 for the reception of the adjacent portion of the hoop 17 so that the arms 15 support the hoop in horizontal position and interlock yieldably to the plate 10. It is apparent that by exerting force upon the outer side of the ring or hoop 17 the inner side thereof is sprung into and out of the seat 20, and the ribs or crimps 19 provide shoulders which resist the swinging of the ring or hook upon the outer ends of the arms 15 as a fulcrum until considerable pressure is applied to cause the swinging of the ring 17. It will also be noted that the arms 15 have their hooks 18 rolled downwardly and outwardly so that the arms engage across the upper side of the ring 17 and assist the upper crimp 19 in holding the ring 17 firmly in horizontal position. The bag 18′ is free to hang down from the ring or hoop 17 and the basket may be readily removed from the clip by swinging the ring 17 upwardly about the hooks 18 so as to snap the inner side of the ring past the lower crimp 19. The ring 17 may then be moved downwardly out of engagement with the hooks 18.

The supporting clip may be sold as a separate unit from the basket with its ring 17, or sold as a part thereof and the entire device may be readily collapsed and packed in small form for storage and handling. The clip itself may be made in one piece of sheet material suitably bent and crimped to provide the door engaging hook and other parts of the device so that the ring 17 of the basket may be quickly engaged with the hooks 18 of the arms and may be swung on the hooks into interlocking engagement with the crimps or shoulders 19.

It is obvious that various changes and modifications may be made in the details of construction and design of the above specifically described embodiment of this invention without departing from the spirit thereof, such changes and modifications being restricted only by the scope of the following claims.

What is claimed is:

1. A game device comprising a basket having a ring at its upper edge, a clip having a hook portion at its upper end for engagement over the upper edge of a door, and a pair of arms extending outwardly in spaced relation from the clip and provided with ring engaging hooks on their outer ends engaging the ring at spaced points, said clip having spaced outwardly pressed crimps detachably engaging opposed portions of the ring between said arms, said ring adapted to be swung on the hooks of said arms into and out of engagement with said crimps.

2. A support for goal baskets for basket ball games, comprising a flat plate having a hook portion at its upper end for engagement over the upper edge of a door, a pair of arms mounted on the lower portion of the plate in transversely spaced apart relation and provided with downwardly extending hooks at their outer ends for engaging spaced portions of the ring at the upper end of a goal basket, said plate having outwardly pressed projections spaced apart to provide a groove therebetween and said ring of the basket adapted to be swung on said hooks of the arms into said groove and said projection adapted to yieldingly hold the ring in horizontal position and outwardly from said plate.

3. A support for goal baskets for basket ball games, comprising a plate having door engaging means for detachably supporting the plate against the side of a door, said plate having a pair of outwardly extending arms with hooks on their outer ends and also having a pair of vertically spaced apart projections pressed outwardly on the surface of the plate and disposed between said arms, said arms and said projections being arranged in a substantially horizontal plane with respect to the position of the plate on the door, said hooks of the arms adapted to engage at spaced points the ring of a goal basket and said projections adapted to releasably hold the ring therebetween and in said hooks for supporting the ring in substantially horizontal position.

4. A goal device for basket ball games comprising a basket having a ring at its upper end, a plate having an overturned hook on its upper end adapted to engage the upper edge of a door for holding the plate against the side of the door, said plate having horizontally spaced apart arms extending outwardly from the plate and having downwardly and outwardly rolled hooks upon their outer ends adapted to engage the ring of the basket at spaced points, said arm being proportioned in length with respect to the diameter of the ring to bind the inner side of the ring against the plate and between the arms, said plate having vertically spaced apart projections pressed outwardly therefrom between the arms to provide a groove between the projections for the reception of the inner side of said ring, said ring adapted to be snapped over the lower projection when swung into position for holding the ring firmly at substantially right angles to the plate.

5. In a game device, a basket ring, a clip having a thin flat bridge portion adapted to rest on top of a door or the like and having spaced down-turned front and rear flanges, said front flange having members projecting from its front face for engaging the ring at spaced points thereon for detachably holding the ring and supporting it in horizontal position.

6. In a game device, a basket ring, a clip having a thin flat bridge portion adapted to rest on top of a door or the like and having spaced down-turned front and rear flanges, said ring and front flange having coacting parts, whereby they may be detachably secured together for holding the ring in horizontal position for playing.

7. In a game device, a basket ring, a clip having a thin flat bridge portion adapted to rest on top of a door or the like and having spaced down-turned front and rear flanges, said front flange having spaced parts for detachably engaging the ring at different spaced points thereon for supporting the ring in horizontal position, whereby the ring and clip may be assembled together and supported rigidly from a door without the use of tools or separate fastening parts.

ARTHUR A. SCHABINGER.

DISCLAIMER

Re. 20,898.—*Arthur A. Schabinger*, Chicago, Ill. DEVICE FOR BASKETBALL GAMES. Patent dated October 25, 1938. Disclaimer filed May 6, 1940, by the patentee.

Hereby disclaims claims 5, 6, and 7 of said reissue patent.

[*Official Gazette May 28, 1940.*]